No. 771,706. PATENTED OCT. 4, 1904.
C. E. BROUGHTON.
PROCESS OF DESTRUCTIVE DISTILLATION OF RESINOUS WOOD.
APPLICATION FILED JUNE 13, 1904.
NO MODEL.
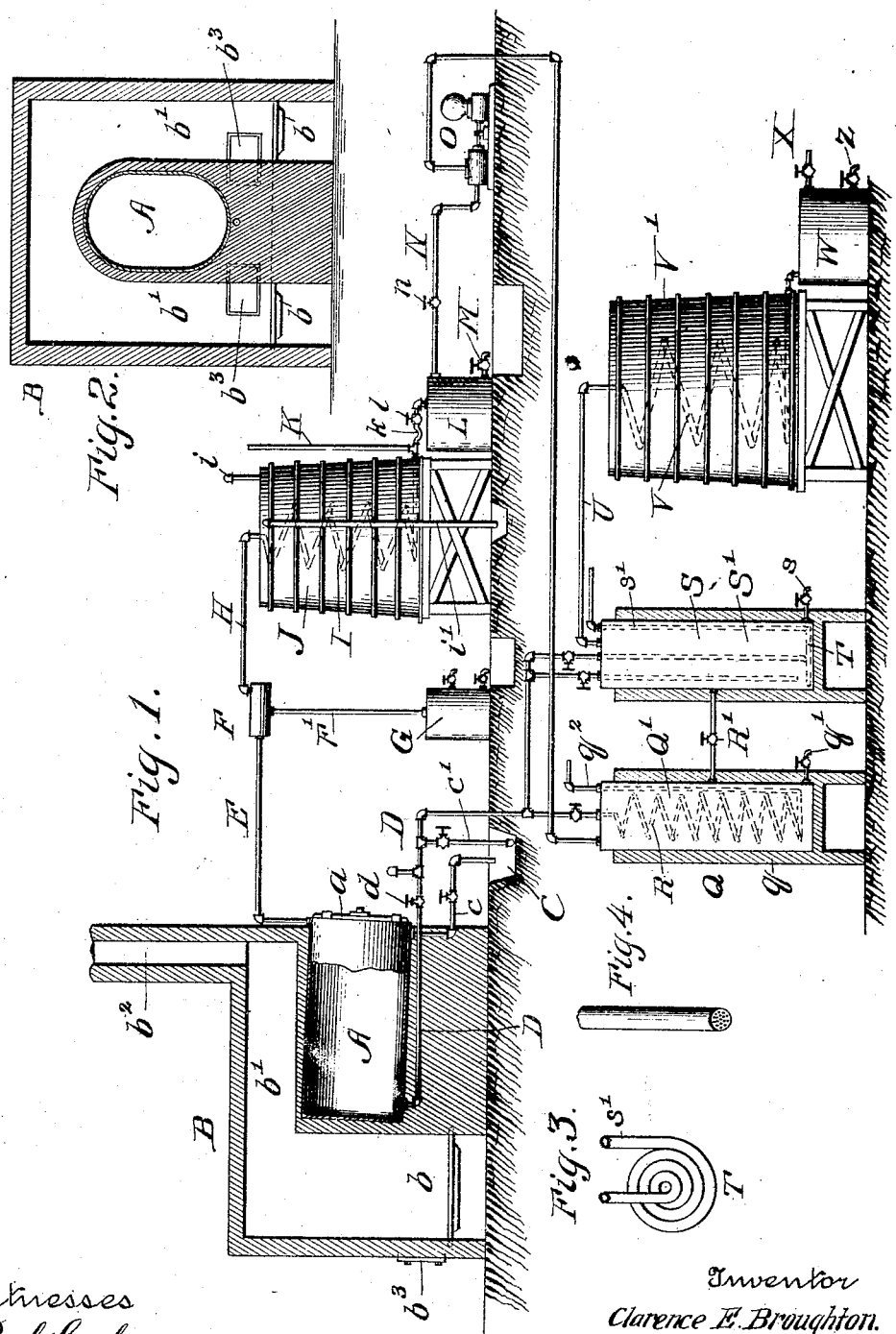
Witnesses
Paul Gathmann
Ernest Pulsford
Inventor
Clarence E. Broughton.
By his Attorneys
Baldwin & Wight.

No. 771,706.

Patented October 4, 1904.

UNITED STATES PATENT OFFICE.

CLARENCE ERNEST BROUGHTON, OF SAVANNAH, GEORGIA.

PROCESS OF DESTRUCTIVE DISTILLATION OF RESINOUS WOOD.

SPECIFICATION forming part of Letters Patent No. 771,706, dated October 4, 1904.

Application filed June 13, 1904. Serial No. 212,285. (No model.)

*To all whom it may concern:*

Be it known that I, CLARENCE ERNEST BROUGHTON, a citizen of the United States, residing at Savannah, in the county of Chatham and State of Georgia, have invented certain new and useful Improvements in Processes of Destructive Distillation of Resinous Wood, of which the following is a specification.

My process is intended especially to extract from resinous pine wood the spirits of turpentine, tar, tar-oil, pine-oils, creosote, pyroligneous acid, pitch, and gas which they contain and to leave in the retort practically pure charcoal. By my process the several constituents are separately collected and turpentine as pure white spirits is obtained.

The wood used in my process is obtained from the fallen or dead pine trees of the Southern States, in which the resins are concentrated in the trunk and limbs of the trees. These are cut up into logs, blocks, chunks, or billets and charged into a retort to which superheated steam at a pressure of about sixty pounds is admitted and with which the wood is treated for a period of about six hours until the readily-vaporizable or light oil of turpentine is distilled without becoming empyreumatic. During this period weakly-acid water is also carried over with the turpentine, but all other constituents of the wood remain behind. The turpentine and weak acid thus driven over are condensed and received in a suitable receptacle, where the turpentine separates from the acid-water. A fire is then started beneath the retort and the temperature raised sufficiently to distil the remainder of the turpentine, the lighter tar-oils, and some (a very little) creosote. This treatment is continued for about six hours, the tar-oils being trapped and conducted to a suitable receptacle, while the turpentine and a small quantity of creosote which passes over with it is condensed and mixed with the turpentine first distilled. A small quantity of tar is carried over mechanically with the turpentine, which slightly discolors it, and this is removed in a subsequent treatment.

As soon as the turpentine has been all driven off and it appears that the heavier tar-oils have commenced to distil, steam is shut off and the fire heat is raised sufficiently to drive off all of the heavier oils, such as creosote and the balance of the tar-oils. This treatment is continued for about fourteen hours, when it will be found that practically pure charcoal only remains, the tar being drawn off from time to time as it collects in the bottom of the retort. The tar-oils are trapped and combined with the tar-oils previously distilled, while the creosote passes through the condenser and is collected in a suitable receiver.

It will thus be seen that practically pure turpentine having no smell of the fire is obtained during the first stage of the process, while during the second period of treatment the remainder of the turpentine is collected, which is only slightly discolored and only slightly empyreumatic. During the first and second periods the tar-oils and weak pyroligneous acid are separated and collected in separate receptacles. During the third period nothing is added to the turpentine previously distilled, while the creosote and heavy tar-oils are separated and collected.

As before stated, the turpentine obtained in the manner above described is somewhat impure, and in order to obtain the pure white spirits it is subjected to further treatment, being first run through a heater, from which it passes to a still heated above the boiling-point of water and preferably to that of turpentine. In this treatment the turpentine is separated from the tar and creosote and all other impurities which it contains, and it condenses as pure white spirits. The turpentine is not necessarily boiled in this last step of the process, as, preferably, a jet of wet steam is admitted from time to time to the still, which as it passes off therefrom carries over globules of turpentine mechanically. This process of obtaining the pure white spirits of turpentine may be carried on continuously, as the heater may be kept supplied with enough of the impure spirits to supply the still while a charge of wood is undergoing distillation in the retort, the heater being replenished, if necessary, after each charge has been reduced.

In the practice of my invention I employ a novel apparatus, which is illustrated in the accompanying drawings, in which—

Figure 1 is a diagram illustrating an apparatus in which my process may be carried on. Fig. 2 shows a transverse section of the retort and its furnace. Fig. 3 is a detail view of the steam-coil employed in the still. Fig. 4 is a detail view of the pipe through which live or wet steam is introduced into the still.

The retort A may be of any suitable construction. Preferably it is located in a furnace B, the walls of which completely surround the retort except at its front end, where it is provided with a door a. Two sets of grate-bars b are preferably employed, and the combustion-chambers b' connect with a common chimney b². The fire is supplied with fuel through the doors b³. The retort is preferably made oval in cross-section and of greater length than height. It inclines toward the front end, where it connects with a valved pipe c, leading to a tar well or receptacle C. Where a battery of retorts is employed, the receptacle C is preferably made in the form of a trough, the tar being kept hot by a steam-pipe c'.

Steam is admitted into the retort through a pipe D, fitted with a valve d. From the upper front end of the retort extends a pipe E, connected with a drum F, which is in turn connected with a downtake-pipe F', extending into a tank G, that receives the tar-oils. The drum F also connects with a pipe H, that connects with a condensing-coil I in a tub J, to which water is admitted at i and from which water overflows at i'. The lower end of the condensing-coil extends out through the tub J and connects with a vertical pipe K, through which gas may escape. Just beyond the tub is a trap K', which prevents gas from passing beyond this point. The coil I empties into a receptacle L, the flow of liquid thereto being controlled by a valve l. This tank has a valved outlet M at its lower end, and at its upper end it connects, by means of a pipe N, with a pump O. The pipe N is provided with a valve n. The pump O is connected by a pipe P with a heater Q, comprising a suitable casing q and a metallic cylinder Q', which is tightly closed. The contents of the cylinder are heated by a coil R, connecting with steam-supply pipes, as shown. A draw-off cock q' is provided at the bottom of the cylinder Q', and this cylinder is connected, preferably midway between its upper and lower ends by means of a valve-pipe R', with a still S, which is similar in general construction to the heater Q. It is provided with a draw-off cock s at its lower end, and it is heated by a steam-coil T at the bottom of the cylinder S' and which connects with the steam-supply pipes in the manner shown.

q² indicates the exhaust-pipe for the coil R, and s' indicates the exhaust-pipe for the coil T. At its upper end the cylinder S' is connected by a pipe U with a condensing-coil V in a tub V', which is supplied with cold water in any suitable way. The condensing-coil empties at its lower end into a receptacle W, provided with a valved outlet X at its upper end and a draw-off cock Z at its lower end.

The retort is preferably of a size suitable for acting on a cord of resinous wood at one time. After the retort is charged steam is admitted thereto through the pipe D at a temperature approximating 300° Fahrenheit. This treatment of the wood by steam is preferably continued for about six hours, during which time the wood is softened and the readily-vaporizable turpentine is driven off through the connections above described and is received in the tank L. At the same time some weakly-acid water also passes off with the turpentine; but the latter is not rendered empyreumatic and is practically pure, except that it is mixed with pyroligneous water and condensed steam. This can be readily separated in the tank L, the condensed steam and pyroligneous water being drawn off through the cock M or all the turpentine which rises to the top being drawn off from above the water and pyroligneous water. I prefer, however, to let the contents of the tank L remain there until the remainder of the turpentine has been distilled from the wood. This is done by the second stage of the process, in which steam at the same temperature is admitted to the retort and a fire is started up in the furnace, the temperature being raised to from 450° to 500° Fahrenheit, and this is continued for about six hours, the wood being thus subjected to the combined action of steam and fire heat, which causes all of the remaining turpentine to be driven off and also the lighter tar-oils and some (a very little) creosote. The tar-oils are trapped in the drum F and pass down the pipe F' into the receptacle G, while the turpentine and the small quantity of creosote that passes over with it is condensed and is received in the tank L, which then contains practically pure turpentine, except that it is combined with a small quantity of creosote and some tar that passes over during the first and second periods of the distillation. The pyroligneous water and condensed steam can of course be easily separated, but the creosote and tar cannot be separated until the turpentine is further refined. While this stage of the process usually lasts over six hours, it is safest to test the distillate with a hydrometer, and if this rises to, say, 92° this part of the process is discontinued. After the pyroligneous water has been drawn off the pump O is put into operation and transfers the turpentine to the heater Q, which is kept at a temperature preferably of 150° Fahrenheit. The turpentine may be kept in this heater as long as desired and transferred to the still as needed. After the receptacle L has been emptied the supply of steam is shut off from the retort and the fire heat is raised, preferably, to about 800° Fahrenheit. This is continued for about fourteen hours, and during this stage of the process the remaining tar-oils and the creosote are vaporized, the tar-oils condensing in the drum F and mixing with the tar-oils already received in the receptacle G, while the creosote is condensed and enters the tank L, from which it may be withdrawn as it accumulates. From time to time during the process tar which accumulates in the bottom of the retort is drawn off through the pipe c.

After the treatment above described, which usually lasts from twenty-six to thirty hours, it will be found that only charcoal remains in the retort. This is practically pure carbon and when drawn from the retort easily crumbles. In order to refine the turpentine received in the heater Q, it is passed through the pipe R' into the still S, which is preferably heated to approximately the boiling-point of turpentine, though it may be heated to a less degree. In the still the turpentine is separated from the creosote and tar or any other small quantities of impurities that it may contain and received in the receptacle W as pure white spirits of turpentine, mingled, of course, with water of condensation, which may be easily separated. As received in the tank W the turpentine is ready for shipment. The tar, &c., may be drawn off at s.

I find that much better results are obtained by using a flat coil at the bottom of the still than a long one, such as used in the heater. I also find that by introducing live steam into the still the distillation of the turpentine is promoted and only a moderate amount of heat is necessary, as the turpentine is largely carried over mechanically by the steam as it passes out of the still. After the charge of wood in the retort has been thus distilled and the charcoal has been removed the retort is cleaned, preferably by jets of steam introduced into it, and then a new charge of wood is introduced and the process repeated in the manner before described.

By using a battery of retorts with suitable connections and using a single heater and still I can operate continuously only a portion of the contents of the heater being drawn into the still at any one time, and as the heater keeps the turpentine at relatively high temperature it does not tend to chill the still when entering it, and the vaporization of the turpentine may be commenced promptly.

I claim as my invention—

1. The process herein described for the destructive distillation of resinous wood, which consists in first treating the wood in a distilling-retort with superheated steam to drive off the easily-distilled light turpentine-oils without rendering them empyreumatic, then subjecting the wood to the combined action of steam and fire heat at a higher temperature above the boiling-point of turpentine to drive off the remainder of the turpentine and the light oils, separately collecting the turpentine and tar-oils thus driven off, then subjecting the wood to the action of fire heat alone at a higher temperature to drive off the creosote and heavy tar-oils, separately collecting the creosote and tar-oils thus driven off, and from time to time drawing off tar from the retort whereby at the end of the treatment pure charcoal shall be left in the retort.

2. The process herein described for the destructive distillation of resinous wood which consists in first treating the wood in a distilling-retort with superheated steam at a temperature of approximately 300° Fahrenheit to drive off the easily-distilled light turpentine-oils without rendering them empyreumatic, then subjecting the wood to the combined action of steam and fire heat at a temperature approximately of from 450° to 500° Fahrenheit to drive off the remainder of the turpentine and the light tar-oils, separately collecting the turpentine and tar-oils thus driven off, then subjecting the wood now deprived of all the turpentine-oils to the action of fire heat alone at a temperature of approximately 800° Fahrenheit to drive off the creosote and heavy tar-oils, separately collecting the creosote and tar-oils thus driven off, and from time to time drawing off tar whereby at the end of the treatment pure charcoal shall be left in the retort.

3. The process hereinbefore described for the destructive distillation of resinous wood which consists in first treating the wood in a distilling-retort with superheated steam injected at a temperature approximating the boiling-point of turpentine to drive off the easily-distilled light turpentine-oils without rendering them empyreumatic, then continuing the injection of steam and subjecting the wood to the combined action of steam and fire heat at a higher temperature considerably above the boiling-point of turpentine to drive off the remainder of the turpentine and the light tar-oils, and separately collecting the turpentine and tar-oils thus driven off.

4. The process of extracting turpentine from wood containing it, which consists in subjecting the wood to superheated steam under pressure and at a temperature approximately the boiling-point of turpentine whereby the greater portion of the contained turpentine is extracted and volatilized, conducting off and condensing the vapors, exposing the wood to steam raised to a higher pressure and a temperature considerably above the boiling-point of turpentine by the external application of flame, whereby the remainder of the turpentine is extracted and volatilized, and conducting off and condensing the vapors.

In testimony whereof I have hereunto subscribed my name.

CLARENCE ERNEST BROUGHTON.

Witnesses:
M. E. BURGESS,
GEO. H. HAINES.